INVENTORS.
CECIL P. PORTERFIELD &
GRAHAM R. ADAMS
BY
Meyer, Tilberry & Body
ATTORNEYS

INVENTORS.
CECIL P. PORTERFIELD &
GRAHAM R. ADAMS
BY

*Meyer, Tilberry & Body*

ATTORNEYS

United States Patent Office 3,506,907
Patented Apr. 14, 1970

3,506,907
GATING CONTROL OF A RESONANT BRIDGE INVERTER FOR INDUCTION HEATING USE
Cecil P. Porterfield, Parma, and Graham R. Adams, Warrensville Heights, Ohio, assignors to Park-Ohio Industries, Inc., Cleveland, Ohio, a corporation of Ohio
Filed Oct. 4, 1967, Ser. No. 672,905
Int. Cl. H02m 7/48; H02p 13/18
U.S. Cl. 321—45  12 Claims

ABSTRACT OF THE DISCLOSURE

There is provided an improvement in a series resonant bridge inverter of the type adapted for induction heating and having two separate switching circuits energized alternately by gating silicon controlled rectifiers in each switching circuit with a train of gating pulses. This improvement includes substantially reducing the frequency of the gating pulses as they are first initiated to prevent coinciding activation of silicon controlled rectifiers in the separate switching circuits.

---

The present invention pertains to the act of induction heating with a resonant bridge inverter and more particularly to an improvement in the gating control of a resonant bridge inverter for use in induction heating.

The present invention is particularly applicable for use in an induction heating installation, and it will be described with particular reference thereto; however, it is appreciated that the invention has much broader applications and may be used in various other installations having power requirements similar to that experienced in induction heating.

Induction heating apparatus have been used for many years in various industrial applications. These apparatus generally include an inductor surrounding, or adjacent to, a workpiece and a power supply for passing an alternating current through the inductor to induce circulating heating currents in the workpiece. In the past, motor-generator sets have been extensively to power the inductor, especially when relatively low frequencies are required. Higher frequencies have necessitated the use of electronic power supplies, usually in the form of an oscillator. Both motor-generator sets and oscillators have been quite successful in induction heating; however, with the advent of various solid state electronic devices, there has been considerable effort devoted to the development of a solid state power supply for introducing an alternating current into the inductor of an induction heating installation. Some of these solid state devices have taken the form of harmonic voltage triplers or multipliers wherein a three phase input is converted into a single phase output having a frequency higher than the input frequency. Also, it has been suggested that an inverter, which converts direct current into an alternating current output, could be used for induction heating. The present invention is directed toward an improvement in such an inverter which will allow it to be more susceptible to use in the induction heating field.

At this time, the most promising solid state inverter for use in induction heating is the resonant bridge inverter. This inverter generally incorporates a bridge circuit having a central, common branch through which currents are passed in opposite directions by gating separate pairs of silicon controlled rectifiers in spaced switching legs or branches. Usually four such switching legs or branches are provided to control the flow of current through the common bridge branch of the inverter. The silicon controlled rectifiers are generally shunted by inversely positioned diodes and a commutating capacitor is placed in the common branch of the bridge. By gating two selected silicon controlled rectifiers, current flows through the capacitor in a given direction. By incorporating inductances in series with the gated silicon controlled rectifiers or in the common branch of the inverter, a series resonant circuit is established when each set of switching legs are conductive. Consequently, as the two selected rectifiers are gated "on," a resonant system is created between the inductances in the switching legs and the commutating capacitor. This causes the current flow through the common branch of the inverter to be somewhat sinusoidal due to the exchange of current and energy between the capacitor and the inductors or inductances.

When the current attempts to flow in a direction reverse to the forward direction of the silicon controlled rectifiers, the current flows through the shunting diodes. This reverse current through the shunting diodes turns "off" or commutates the silicon controlled rectifiers and blocks further flow of current through these rectifiers until they are substantially gated while subjected to a forward bias. Thereafter, the other two legs of the bridge, also having silicon controlled rectifiers, are gated "on" so that current having the same basic electrical characteristics pass through the common branch of the bridge, but in the opposite direction. By controlling the silicon controlled rectifiers, one set is "on" while the other set is commutated, or "off." This creates a generally sinusoidal wave in the common branch of the inverter. By connecting this common branch of the inverter with an induction heating load, an alternating current is imposed upon the load.

In the past, a resonant bridge inverter, as described above, is controlled by a plurality of repeated gating pulses which have a frequency that alternately initiates current flow through the various switching circuits. Two separate sets or trains of gating pulses are required so that the separate switching legs of the inverter may be initiated in proper time sequence with the other switching legs. Such an arrangement is satisfactory for many uses of an inverter. However, the use of the inverter for induction heating imposes certain load induced characteristics. This is especially true when the inverter is first switched "on." When this happens the various resonant components of the inverter circuit are not at a steady state condition. It has been found that upon initial energization of the inverter, when the inverter is connected to an induction heating load, both transients and load imposed electrical characteristics can cause a shift in the proper position for activation of the various silicon controlled rectifiers, hereinafter called SCRs. Consequently, one set of SCRs in the resonant bridge inverter may be gated at a time when the other set of SCRs has not been commutated. This causes a direct short across the D.C. power leads to the inverter which can destroy the SRCs.

Since this damage to the SCRs takes place at once, it is difficult for an operator to determine the cause of the damage. The operator can only observe that the inverter has not commenced operation. The destruction of the SCRs can be determined quite easily. However, it is difficult, knowing only these facts, to correct the problem which has caused the aborted energization of the inverter. Fuses can be used to protect the SCRs; however, this arrangement requires substantial time delay in replacing blown fuses.

The present invention is directed toward an improved gating control device which can be used in a resonant bridge inverter to reduce the possibility of damage to the silicon controlled rectifier caused by load imposed variations in the operating parameters of the inverter and transient conditions created during the initiation of inverter operation.

In accordance with the present invention, there is provided an improvement in the resonant bridge inverter of the type comprising a common branch, a first switching circuit for passing current through the branch in a first direction, a second switching circuit for passing current through the branch in a second direction opposite to the first direction, and means for creating a series of repeating pulses for alternately energizing the switching circuits at a selected rate. This improvement comprises means for reducing the frequency of the gating pulses as they are first initiated.

In accordance with the invention, as defined above, the frequency of the gating pulses is relatively low at the initial portion of the power cycle for the inverter. This allows sufficient time for each of the silicon controlled rectifiers to be commutated before a forward bias and a gating pulse is applied thereto. This prevents the premature gating of a silicon controlled rectifier in the inverter circuit during initial operation of the inverter when transients and other electrical characteristics can cause a prolonged delay in the commutation of the various silicon controlled rectifiers.

The primary object of the present invention is the provision of an inverter with a gate control device which adapts the inverter for use in the induction heating field.

Another object of the present invention is the provision of a gate control device for a resonant bridge inverter having silicon controlled rectifiers, which device lessens the probability of damage to the silicon controlled rectifiers during start-up, even with adverse loading of the inverter.

Yet another object of the present invention is the provision of a gate control device for a resonant bridge inverter having silicon controlled rectifiers, which device generates a series of gating pulses having a lower frequency at the start of the inverter.

Still another object of the present invention is the provision of a gate control device for a resonant bridge inverter having silicon controlled rectifiers, which device slows down the firing rate of the silicon controlled rectifier when the inverter is first started.

These and other objects and advantages will become apparent from the following description used to illustrate the preferred embodiment of the invention as read in connection with the accompanying drawing in which.

Figure 1:
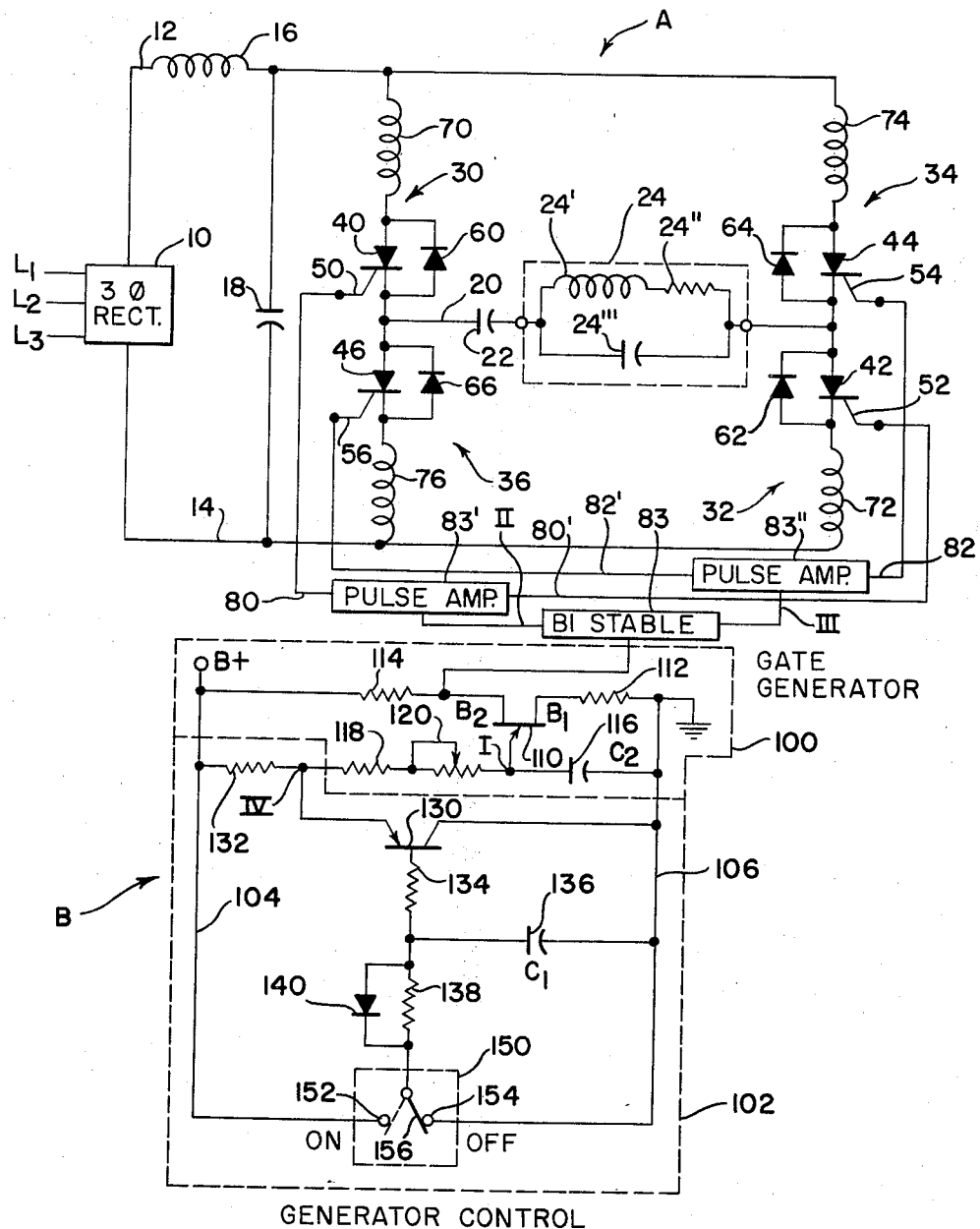
FIGURE 1 is a wiring diagram illustrating, somewhat schematically, a somewhat standard inverter provided with the preferred embodiment of the present invention.

Referring now to the drawings wherein the showings are for the purpose of illustrating a preferred embodiment of the invention only and not for the purpose of limiting the same, FIGURE 1 shows a series resonant bridge inverter A having a power supply, represented by a three phase rectifier 10, having input lines $L_1$, $L_2$ and $L_3$ and output leads 12, 14. A filter choke 16 and a filter capacitor 18 reduce the ripple across leads 12, 14. In accordance with normal practice, the inverter A includes a common branch 20 having a commutating capacitor 22 and an induction heating load 24, connected in series with the capacitor. The induction heating load may take a variety of forms that can be generally represented by an equivalent circuit including series connected inductance 24' and resistance 24'' and a capacitor 24''' connected in parallel with the aforementioned components. Inverter A includes four spaced switching legs, or branches, 30, 32, 34 and 36, each of which has at least one silicon controlled rectifier, or SCR, 40, 42, 44 and 46, controlled by gates 50, 52, 54 and 56, respectively. Diodes 60, 62, 64 and 66 are connected in an inverse manner across the SCRs. To provide a series resonant circuit when the switching legs are actuated, the legs include inductors 70, 72, 74 and 76, respectively. Gate signals, or pulses, are imposed on gates 50, 52 through lines 80 and 80'. In a like manner, gating pulses are imposed on gates 54, 56 through lines 82 and 82'. The gating pulses of lines 80 and 80' are received from a point II and, the gating pulses of lines 82 and 82' are received from a point III. These points are the output of a bistable device 83 driven by a gating control device B, which incorporates the present invention and will be discussed later. The signals in lines 80, 80', 82 and 82' are amplified by amplifiers 83' and 83'' beyond points II and III.

Figure 2:
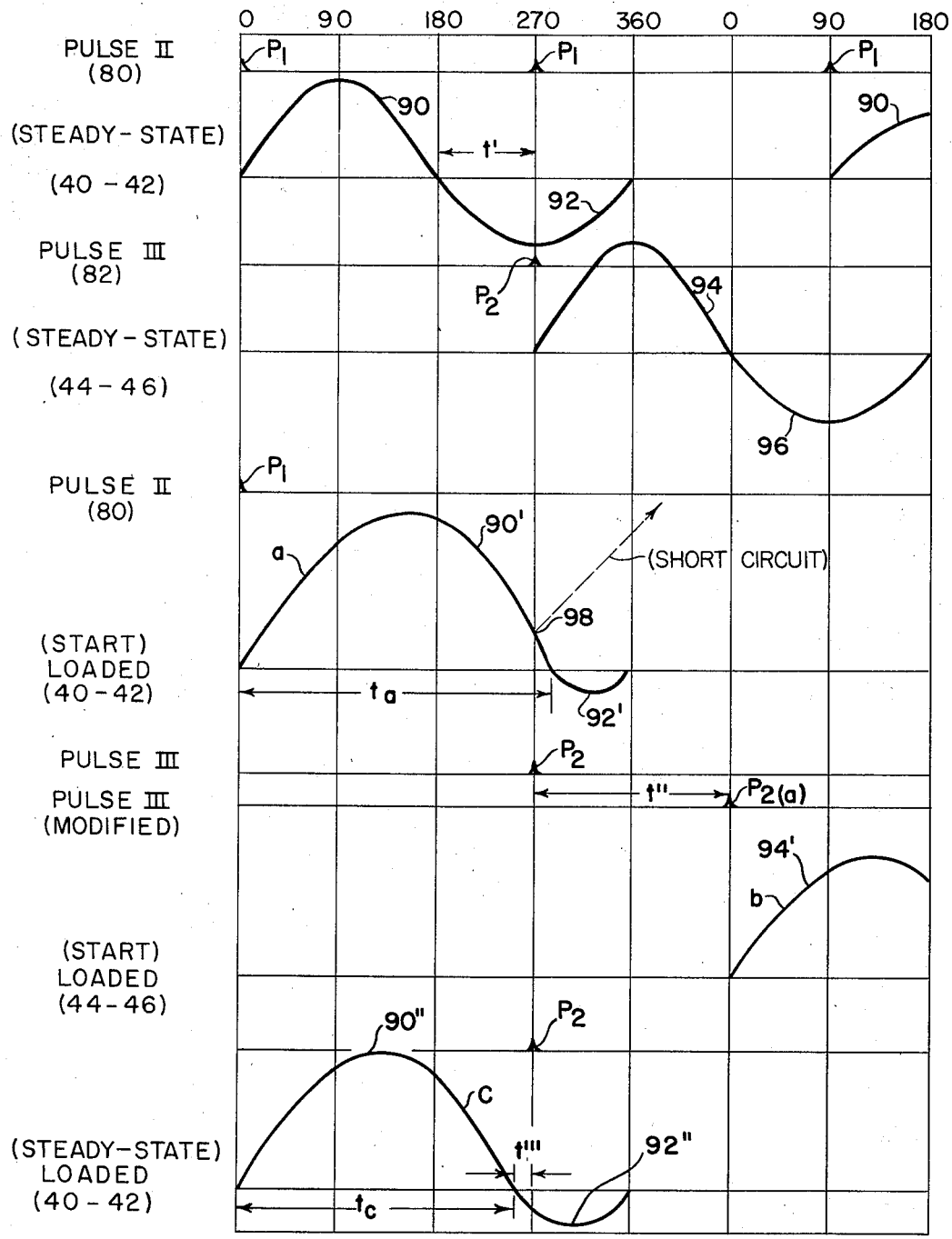
FIGURE 2 is a graph illustrating certain operating characteristics of a resonant bridge inverter of the type to which the present invention is particularly adapted; and, FIGURE 3 is a graph illustrating certain operating characteristics of the preferred embodiment as shown in FIGURE 1.

Referring now to FIGURE 2, certain operating characteristics of the inverter A are graphically illustrated. The repeating pulses $P_1$ are the gating pulses for lines 80 and 80', while the repeating pulses $P_2$ are the gating pulses for lines 82 and 82'. These pulses are properly polarized to cause sequential conduction of the SCRs in the inverter. The uppermost curve represents the steady-state current caused by gating SCRs 40, 42. In a like manner, the next curve represents a steady-state current caused by gating SCRs 44, 46. In this context, "steady-state" means the condition after the inverter is in operation, as opposed to the condition at the start-up of the inverter. Referring now to the first current curve, it includes a positive portion 90 and a negative portion 92. When SCRs 40, 42 are gated "on" the current illustrated in this curve flows through the switching legs 30, 32. The positive portion 90 passes in a forward direction through the SCRs; however, the SCRs cannot pass the current in the opposite direction. For this reason, the shunting diode passed the negative portion 92. When a negative or reverse current is passed through the switching legs, the SCRs are commutated, or turned "off." The time for commutating the SCRs may be in the range of 10–30 microseconds. The other SCRs should not be gated until this commutating time has elapsed. Pulse $P_2$ gates the second set of SCRs, 44 and 46, after the time $t'$, which time is substantially greater than commutating time of the SCRs. Consequently, the second set of SCRs are gated "on" after the first SCRs have been commutated. The current through the induction heating load 24 is the vectorial summation of the two current curves illustrated in the upper portion of the graph in FIGURE 2.

Referring now to curve $a$ of FIGURE 2, this curve represents the current flow of the inverter during the initial start-up and when a high load is connected to the inverter. This current flow has a positive portion 90' and a negative portion 92' for the SCRs 40, 42. Because of the initial transients and the loading effect of the system, the portion 90' is substantially greater than the portion 92'. This means that a substantial current flows through the SCRs for a relatively long time, while a very small current flows through the diodes for a short time to commutate the SCRs. Under certain load conditions and transients caused by initial energization of the various resonant components, the time $ta$ of portion 90' may be greater than the normal spacing between the pulses $P_2$. When this happens, the pulse $P_2$ can gate SCRs 44 and 46 before the other SCRs are commutated. This creates a direct short between the leads 12, 14. This direct short can result in damage to the SCRs within the inverter circuit. The spike 98 indicates the position at which the short would develop if $P_2$ is allowed to occur. This is illustrated by the dashed line labeled "short circuit."

In accordance with the present invention, the initial pulse $P_2$, and the initial pulse $P_1$, are delayed a time, represented by $t''$, as shown in FIGURE 2. In this manner, curve $b$ is initiated when pulse $P_2a$ is received through lines 82 and 82'. The portion 92' of curve $a$ has had sufficient time to commutate the SCRs 40, 42. Thus, there is no short circuit created between the power leads of the inverter. After the inverter has reached the steady-state condition, the current curve $c$ is created. This curve includes a positive portion 90″ and a negative portion 92″. Again the load of the circuit somewhat distorts the curve from that illustrated at the top of FIGURE 2; however, the time $t_c$ is less than the normal spacing of pulses $P_1$ and $P_2$. The difference between the spacing of these pulses and the time $t_c$ is represented as $t'''$. This time is sufficient to commutate the SCRs before the next set is gated. With inductance in the switching legs, the reverse current flow through the diodes cannot drop to zero immediately upon gating the other SCRs. Consequently, the current through the diode continues the commutating function some time after the next SCRs are gated without damage to the SCR being commutated. This reduces the criticality of time $t'''$ somewhat, as long as the reverse current has started flowing before pulse $P_2$ appears. The increased spacing of the gating pulse is required only during the initial start-up of the inverter. Thereafter, the gating pulses can have the constant frequency generally built into the gating circuit for the inverter.

As mentioned above, the present invention contemplates a gating control for a resonant bridge inverter which provides an increased spacing for the initial gating pulses without affecting the normal operating frequency of these pulses. A variety of structures could be used to accomplish this function; however, in accordance with the preferred embodiment of the present invention a gating control device B, as shown in FIGURE 1, is incorporated to provide the gating pulses at points II and III which are connected to lines 80, 80′, 82 and 82′, respectively.

The gating control device B includes, essentially, two units, the gate generator 100, which does not differ substantially from normal gate generators for inverters, and a control 102 for the gate generator. These units include a common power supply between lines 104 and 106, with the former being the positive voltage source. Referring to the generator 100, this device includes a unijunction transistor 110, a $B_1$ resistor 112, and a $B_2$ resistor 114. A control capacitor 116 is connected across the emitter of transistor 110 and base $B_1$ so that the voltage on the capacitor is the voltage applied to the unijunction transistor. Also included in the generator is a relatively fixed charging resistor 118 and a rheostat 120 which is adapted to be adjusted for controlling the frequency of the generated gating pulses at points II and III. The frequency of the generator is also determined by the voltage between ground and control point IV.

In operation, if the control point IV is above a voltage which will impose a voltage in excess of the peak point voltage $V_p$ of the unijunction transistor across the capacitor 116, the capacitor will charge to the peak point voltage and then fire the unijunction transistor. This causes a current flow between lines 104 and 106 so that the voltage of point II rapidly advances toward B+ and the voltage of point III rapidly advances toward ground potential. This discharges the capacitor and turns "off" the unijunction transistor. The voltages at points I and II then shift somewhat exponentially at a rapid rate back to their steady-state values. This provides pulses at both points II and III. The frequency of these pulses is determined by the voltage at point IV and the resistance through which the capacitor 116 is charged. This type of generator is somewhat common for use in an inverter gate control application.

In accordance with the present invention, the generator 100 is controlled by a generator control device 102. This device includes a PNP transistor 130 having an emitter resistor 132 and a base resistor 134. The resistor 132 is relatively small so that it does not substantially affect the charging rate of capacitor 116 as it heats during conduction of current through the transistor 130. Connected across the base and collector of transistor 130 is a capacitor 136, which is charged through a resistor 138 and discharged through a diode 140, connected in parallel with resistor 138. To control the operation of device 102 there is provided a switch 150 illustrated as including an "on" contact 152, an "off" contact 154, and a movable arm 156. Of course other switching devices, such as a transistor switching circuit, could be used as switch 150.

In operation, assuming that the arm 156 is in the "off" position, the inverter A is not operating. The capacitor 136 is discharged through diode 140 so that the base of transistor 130 is substantially grounded. This forward biases the transistor 130 so that the point IV is at a level approaching ground potential. This level is sufficiently low to prevent the capacitor 116 from being charged to the peak point voltage of transistor 110. In this condition, the generator 100 does not operate. Now, if the arm 156 is moved into engagement with the "on" contact 152, the capacitor 136 is charged through resistor 138 towards the positive potential of line 104. This takes place relatively slowly, as determined by the capacitance of capacitor 136 and the resistance of resistor 138. As the capacitor is being charged toward the positive potential, the conductivity of transistor 130 is gradually decreased. This forces the voltage of point IV upwardly toward the potential of line 104. As soon as this potential of point IV is sufficiently high to charge the capacitor 116 to the peak point voltage $V_p$ of transistor 110, the oscillator 100 commences to function. However, since the voltage level f point IV is, at first, relatively low, the rate of charging of the capacitor 116 is also low. This decreases the frequency of the pulses at points II and III. As point IV continues to increase, in a similar manner, the frequency of the pulses at points II and III continue to increase. When the charged potential of capacitor 136 is relatively close to the voltage of line 104, transistor 130 is reverse biased. This stops the conductivity of transistor 130 so that control point IV is at its maximum level. Thereafter, the point IV does not change, and the generator 100 operates at a frequency determined by the parameters of the generator. In other words, the generator control device 102 exponentially increases the voltage at point IV to a limited time during the initiation of the inverter. To a limited time during the initiation oft he inverter. To turn the inverter "off," arm 156 is shifted to contact 154. This immediately discharges capacitor 136 through diode 140. Transistor 130 becomes fully conductive, and point IV is shifted to a voltage level below that which will energize the generator 100. This terminates the operation of the gate generator.

Figure 3:
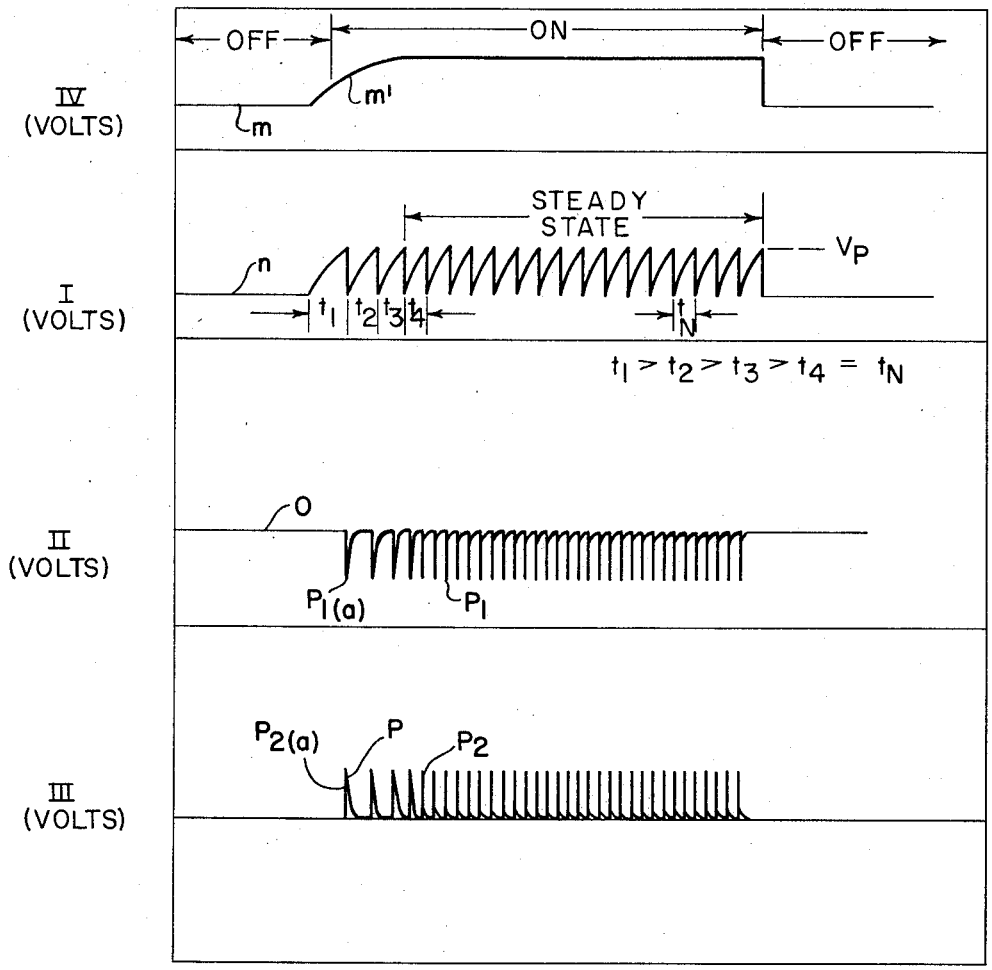

Referring now to FIGURE 3, the operating characteristics of the gate generator provided with control device 102 are illustrated. Curve $m$ illustrates the voltage of point IV during at least one power cycle of the inverter A. Initially the inverter is "off." Then the switch 150 is turned "on" and the point IV advances along a general exponential portion $m'$ of curve $m$. After advancing along portion $m'$ a short distance, the inverter receives gating pulses.

Curve $n$ represents the voltage of capacitor 116. It is noted that the capacitor is charged slowly when the voltage of point IV is relatively low. When the capacitor charges to $V_{p'}$ which is the peak point voltage of the unijunction transistor 110, the capacitor 116 is immediately discharged. This provides a somewhat sawtooth shaped wave. The time of each successive pulse is decreased until the point IV reaches its steady-state condition. This is pulse time represented by $t_1$, $t_2$, $t_3$ and $t_4$ on curve $n$. Each time of the initial pulses is progressively smaller until $t_4$ reaches the steady-state time for each pulse in the generator 100. This takes place when the voltage at ponit IV reaches its maximum positive level. In practice, the steady-state condition is reached after 4–10 pulses. Curves $o$ and $p$ represent the voltage pulses at points II and III. It is noted that two pulses are created upon each discharge of capacitor 116. This does not gate all silicon controlled rectifiers at the same time. If a gating pulse is applied to a silicon controlled rectifier which is conducting in a forward direction or is reverse biased, the gating pulse has no effect on the conductive condition of the SCR. For this reason, each pulse in the pulse train at points II and III is not used to gate the various silicon controlled rectifiers within the inverter A.

By providing the slow or gradual increase in the frequency of the gating pulses, the SCRs within the inverter are commutated before they receive both a forward bias and a gating pulse. This prevents damage to the SCRs during use. Such a feature is especially important when the SCR inverter is used for induction heating where the load can vary over a wide range.

Having thus described our invention, we claim:

1. In a resonant bridge inverter comprising a common branch, an induction heating load connected in said branch, a first switching circuit for passing current through said branch in a first direction, a second switching circuit for passing current through said branch in a second direction opposite to said first direction, means for forming a resonant system in said common branch upon flow of current therethrough whereby said current tends to alternate in polarity, each of said switching circuits being controlled by at least one SCR, generating means for creating a series of repeating gating pulses for each of said SCRs to render conductive the SCR of said switching circuits in an alternate sequence, said SCRs being sequentially rendered non-conductive by the change in polarity of said current flow in said branch, and means for activating said generating means to initiate operation of said inverter, said actuating means creating a series of pulses having a normal steady state spacing, the improvement comprising: said actuating means including a pulse spacing circuit for increasing the spacing between said pulses only when said generating means is initially activated, said pulse spacing circuit being activated for a preselected time during the initial actuation of said generating means.

2. The improvement as defined in claim 1 wherein said pulse spacing circuit increases the spacing between only the first few pulses.

3. The improvement as defined in claim 2 wherein said pulse spacing circuit increases the spacing between at least the first three pulses.

4. The improvement as defined in claim 1 wherein said pulses have a steady state spacing of $t_n$ and said pulse spacing circuit provides an initial spacing of $t_1$, a second spacing of $t_2$ and a third spacing of $t_3$ with $t_1$ being greater than $t_2$, $t_2$ being greater than $t_3$, and $t_3$ being greater than $t_n$.

5. The improvement as defined in claim 1 wherein said pulse spacing circuit includes a control device for said generating means, said control device comprising a capacitor having an original charged condition and an operative charged condition, a circuit for controlling the frequency of said pulses in accordance with the charged condition of said capacitor with the frequency being steady state when said capacitor is at its operative charged condition and the frequency being lower than steady when the charged condition of said capacitor is between said original and said operative conditions, and means for changing the charged condition of said capacitor gradually between said original and said steady state condition upon activation of said generating means.

6. The improvement as defined in claim 5 wherein said generating means is a threshold actuated pulse generator having a given threshold energizing voltage, said generator being controlled by the voltage across said capacitor, said threshold voltage being between said original and said operative charged conditions of said capacitor, and said means for activating said generator means includes said means for charging said capacitor.

7. The improvement as defined in claim 5 wherein said means for changing the charged condition of said capacitor includes means for gradually applying an increased voltage across said capacitor.

8. The improvement as defined in claim 7 wherein said applying means includes a circuit across said capacitor and a second capacitor for controlling the voltage applied across said first-mentioned capacitor.

9. The improvement as defined in claim 1 wherein said generating means includes a pulse generator having an output and an input with the frequency of said output being controlled by the voltage level of said input, and control means for said generator, said control means having a voltage output which varies gradually between an initial value and a final value, said output of said control means being connected to the input of said generator, and said initial value causing a low frequency to be emitted by said generator and said final value causing a desired operating frequency to be emitted by said generator.

10. The improvement as defined in claim 9 wherein said generator has an operating input threshold voltage and said initial value is below said threshold voltage.

11. The improvement as defined in claim 9 wherein said control means includes a capacitor the charged condition of which determines the output level of said control means, and means for gradually changing the charged condition of said capacitor to change the output voltage level of said control means.

12. The improvement as defined in claim 11 wherein said means for activating said generator includes means for charging said capacitor.

References Cited

UNITED STATES PATENTS

| | | | |
|---|---|---|---|
| 3,133,241 | 5/1964 | White | 321—45 |
| 3,260,962 | 7/1966 | Draper | 331—111 |
| 3,264,548 | 8/1966 | King | 321—45 |
| 3,315,146 | 4/1967 | Paice | 321—45 |
| 3,333,179 | 7/1967 | Freeman | 321—45 |
| 3,355,653 | 11/1967 | Paradissis | 321—2 |
| 3,376,493 | 4/1968 | Carlson | 321—45 |
| 3,394,299 | 7/1968 | Lawn et al. | 321—14 XR |
| 3,365,651 | 1/1968 | Rolfes | 321—43 |

OTHER REFERENCES

McMurray, W. and Shattuck, D.P., "A Silicon-Controlled Rectifier Inverter With Improved Commutation," May 2, 1961, pp. 1–8.

LEE T. HIX, Primary Examiner

W. M. SHOOP, Jr., Assistant Examiner

U.S. Cl. X.R.

219—10.77; 331—111